(12) United States Patent
Cramsey

(10) Patent No.: US 6,836,997 B2
(45) Date of Patent: Jan. 4, 2005

(54) ADJUSTABLE BUOYANCY FLOATING FISH LURE

(76) Inventor: John F. Cramsey, 7170 Powder Valley Rd., Zionsville, PA (US) 18092

( * ) Notice: Subject to any disclaimer, the term of this patent is extended or adjusted under 35 U.S.C. 154(b) by 0 days.

(21) Appl. No.: 10/210,536

(22) Filed: Jul. 31, 2002

(65) Prior Publication Data

US 2004/0020102 A1 Feb. 5, 2004

(51) Int. Cl.$^7$ .......................... A01K 93/00; A01K 85/01
(52) U.S. Cl. .................. 43/43.14; 43/42.22; 43/42.35; 43/42.36; 43/42.49; 43/44.91; 43/42.06; 43/44.99
(58) Field of Search ......................... 43/43.14, 42.22, 43/42.35, 42.36, 42.49, 44.9, 44.91, 44.92, 42.06, 44.99

(56) References Cited

U.S. PATENT DOCUMENTS

| | | | | |
|---|---|---|---|---|
| 2,357,472 A | * | 9/1944 | Jenkins | 43/42.36 |
| 2,519,427 A | * | 8/1950 | Besmer | 43/43.14 |
| 2,722,769 A | * | 11/1955 | Blockinger, Sr. et al. | 43/44.91 |
| 2,726,474 A | * | 12/1955 | Soskice | 43/43.14 |
| 2,741,864 A | * | 4/1956 | Shotton | 43/44.9 |
| 2,769,268 A | * | 11/1956 | Miller | 43/42.06 |
| 2,803,082 A | * | 8/1957 | Claybrook | 43/43.14 |
| 2,820,317 A | * | 1/1958 | Irwin | 43/43.14 |
| 2,874,511 A | * | 2/1959 | Hettrick | 43/44.87 |
| 2,986,839 A | * | 6/1961 | Crimble | 43/43.14 |
| 3,012,359 A | * | 12/1961 | Foster | 43/43.14 |
| 3,029,544 A | * | 4/1962 | Dimatteo | 43/43.14 |
| 3,087,275 A | * | 4/1963 | Svoboda | 43/44.91 |
| 3,092,925 A | * | 6/1963 | Ho et al. | 43/43.14 |
| 3,183,620 A | * | 5/1965 | Dockal | 43/43.14 |
| 3,337,981 A | * | 8/1967 | Bowman | 43/43.14 |
| 3,367,058 A | * | 2/1968 | Dominique | 43/42.06 |
| 3,686,787 A | * | 8/1972 | Milovich | 43/44.9 |
| 3,698,120 A | * | 10/1972 | Grogan | 43/43.14 |
| 3,744,176 A | * | 7/1973 | Bondhus | 43/43.14 |
| 3,780,467 A | * | 12/1973 | Lueck | 43/44.9 |
| 3,820,270 A | * | 6/1974 | La Force | 43/43.14 |
| 3,852,906 A | * | 12/1974 | LaForce | 43/43.14 |
| 3,974,591 A | * | 8/1976 | Ray | 43/43.14 |
| 3,990,172 A | * | 11/1976 | Hagquist | 43/43.14 |

(List continued on next page.)

FOREIGN PATENT DOCUMENTS

| | | | | | |
|---|---|---|---|---|---|
| AU | 286106 B1 | * | 9/1968 | | 43/473.14 |
| DE | 2407154 B1 | * | 8/1975 | | 43/43.14 |
| DE | 4027737 B1 | * | 3/1992 | | |
| FR | 1036232 B1 | * | 4/1953 | | 43/43.14 |
| FR | 1404516 B1 | * | 5/1965 | | 43/43.14 |
| FR | 2722367 B1 | * | 1/1996 | | |
| GB | 614801 B1 | * | 12/1948 | | 43/43.14 |
| GB | 2148081 B1 | * | 5/1985 | | 43/43.14 |
| GB | 2172481 B1 | * | 9/1986 | | 43/43.14 |
| JP | 7-303442 B1 | * | 11/1995 | | |
| JP | 10-117650 B1 | * | 5/1998 | | |
| JP | 10-225253 B1 | * | 8/1998 | | |
| JP | 10-248459 B1 | * | 9/1998 | | |
| JP | 2000-14295 B1 | * | 1/2000 | | |
| JP | 2000-139306 B1 | * | 5/2000 | | |

*Primary Examiner*—Darren W. Ark
(74) *Attorney, Agent, or Firm*—Sanford J. Piltch, Esq.

(57) ABSTRACT

A floating fishing lure having the capability to adjust the buoyancy of the fish lure with a high degree of precision, such that the fish lure has fore and aft chamber sections connected and held together by an attaching means. Disposed on each fore and aft chamber sections are a plurality of buoyancy windows, one set of which will coincidentally overlie the other set of buoyancy windows as the fore chamber section is rotationally moved in regard to the aft chamber section. By changing the rotational placement of the two sections, valve aperture openings are produced that regulate the air to water ratio within the fish lure, thereby controlling its buoyancy. Additional fish attractors, hooks and illuminators can be added to the fishing lure.

16 Claims, 5 Drawing Sheets

U.S. PATENT DOCUMENTS

| | | | | |
|---|---|---|---|---|
| 4,060,925 A | * | 12/1977 | Bias | 43/42.35 |
| 4,090,318 A | * | 5/1978 | Webster | 43/43.14 |
| 4,098,017 A | * | 7/1978 | Hall | 43/42.06 |
| 4,195,435 A | * | 4/1980 | Kern | 43/44.9 |
| 4,202,128 A | * | 5/1980 | Hill et al. | 43/43.14 |
| 4,449,318 A | * | 5/1984 | Lane | 43/44.9 |
| 4,546,567 A | * | 10/1985 | Bailey | 43/44.9 |
| 4,610,104 A | * | 9/1986 | Garcia | 43/44.9 |
| 4,630,389 A | * | 12/1986 | Higgins | 43/42.22 |
| 4,693,030 A | * | 9/1987 | Wohead | 43/43.14 |
| 4,696,125 A | * | 9/1987 | Rayburn | 43/43.14 |
| 4,817,326 A | * | 4/1989 | Benjestorf | 43/44.9 |
| 4,841,664 A | * | 6/1989 | Baldwin | 43/42.36 |
| 4,924,620 A | * | 5/1990 | Kimberley | 43/44.9 |
| 4,944,113 A | * | 7/1990 | Jean | 43/43.14 |
| 5,044,110 A | * | 9/1991 | Henderson et al. | 43/42.31 |
| 5,129,178 A | * | 7/1992 | Hicks | 43/44.92 |
| 5,274,945 A | * | 1/1994 | Ross | 43/44.91 |
| 5,361,532 A | * | 11/1994 | Moff | 43/44.91 |
| 5,412,902 A | * | 5/1995 | Hicks | 43/44.92 |
| 5,507,112 A | * | 4/1996 | Cheney, Jr. | 43/41.2 |
| 5,651,210 A | * | 7/1997 | Moore | 43/43.14 |
| 5,970,649 A | * | 10/1999 | Alain et al. | 43/43.14 |
| 6,192,620 B1 | * | 2/2001 | Eckenroth | 43/43.14 |
| 6,354,037 B2 | * | 3/2002 | Coppola, Jr. | 43/42.06 |
| 6,467,214 B1 | * | 10/2002 | DeFrisco | 43/43.14 |
| 6,612,066 B1 | * | 9/2003 | James | 43/43.14 |

* cited by examiner

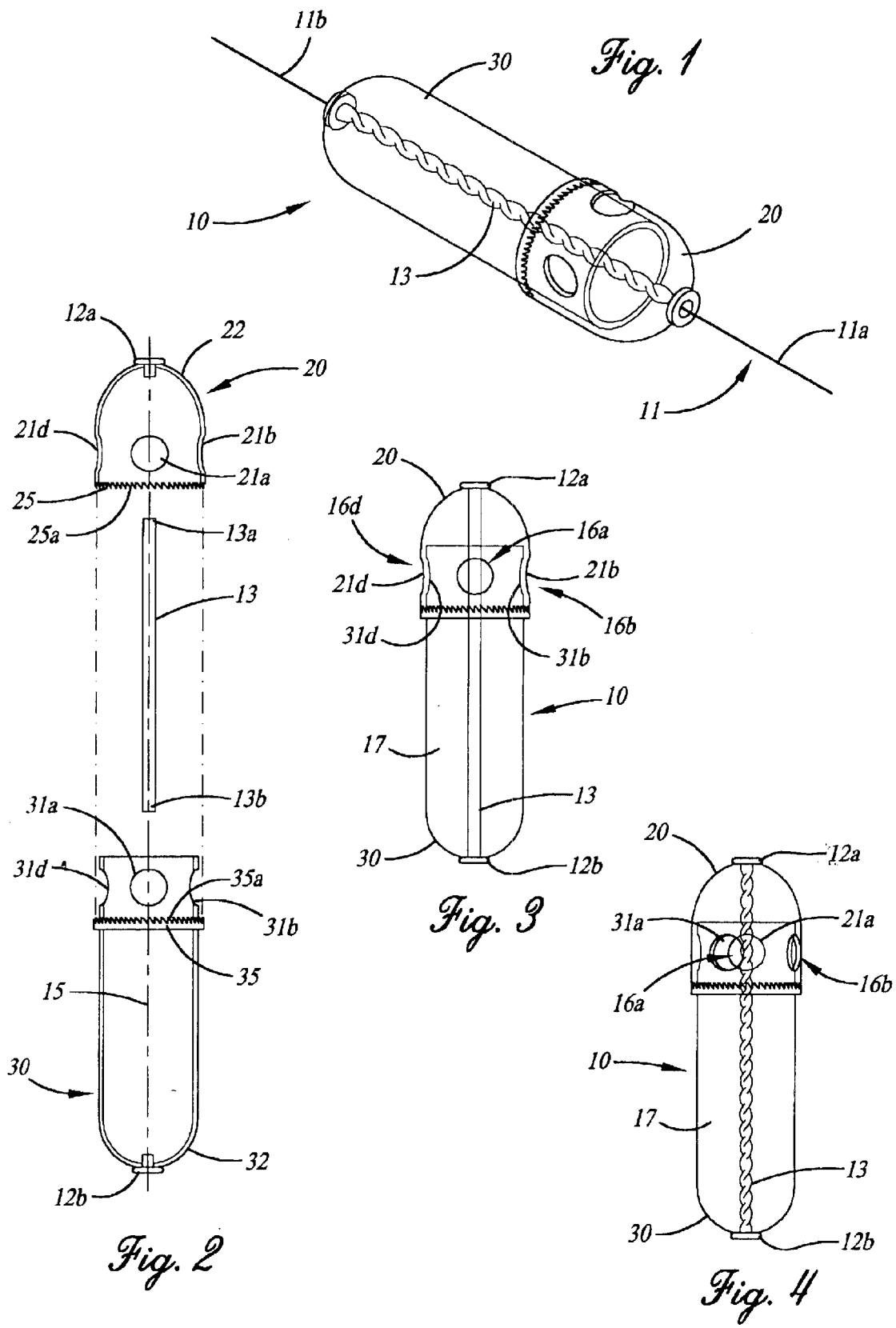

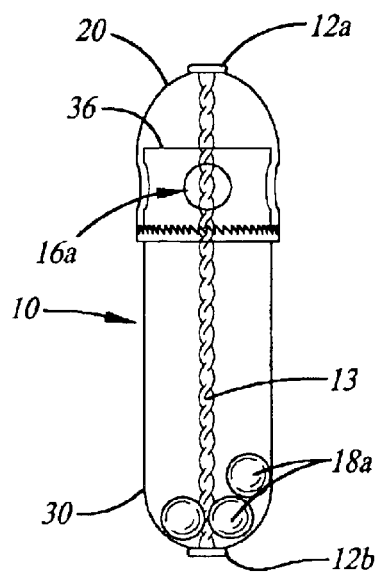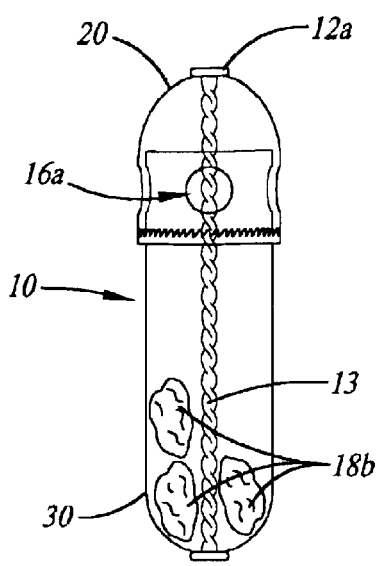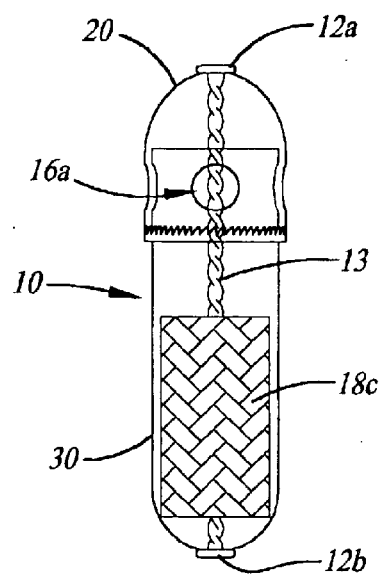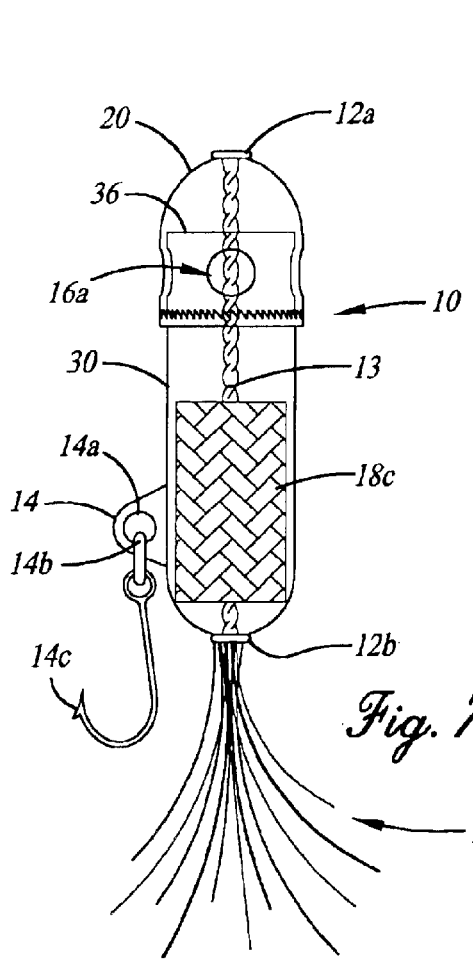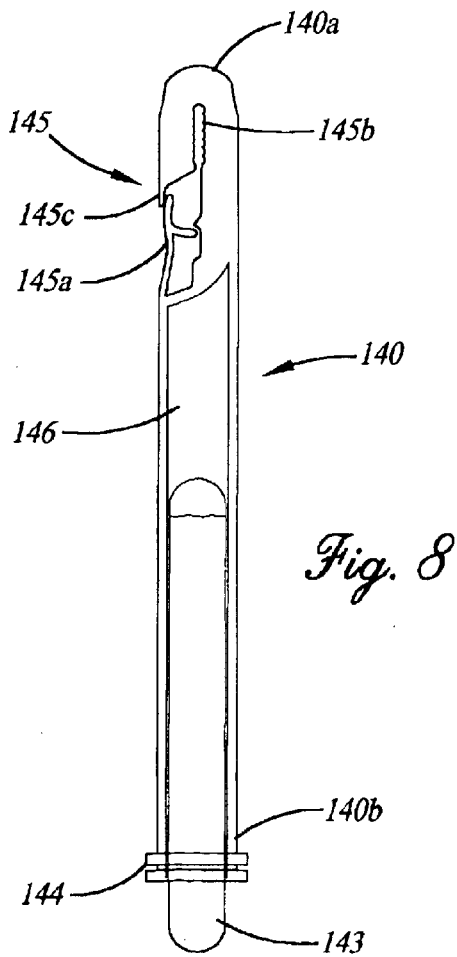

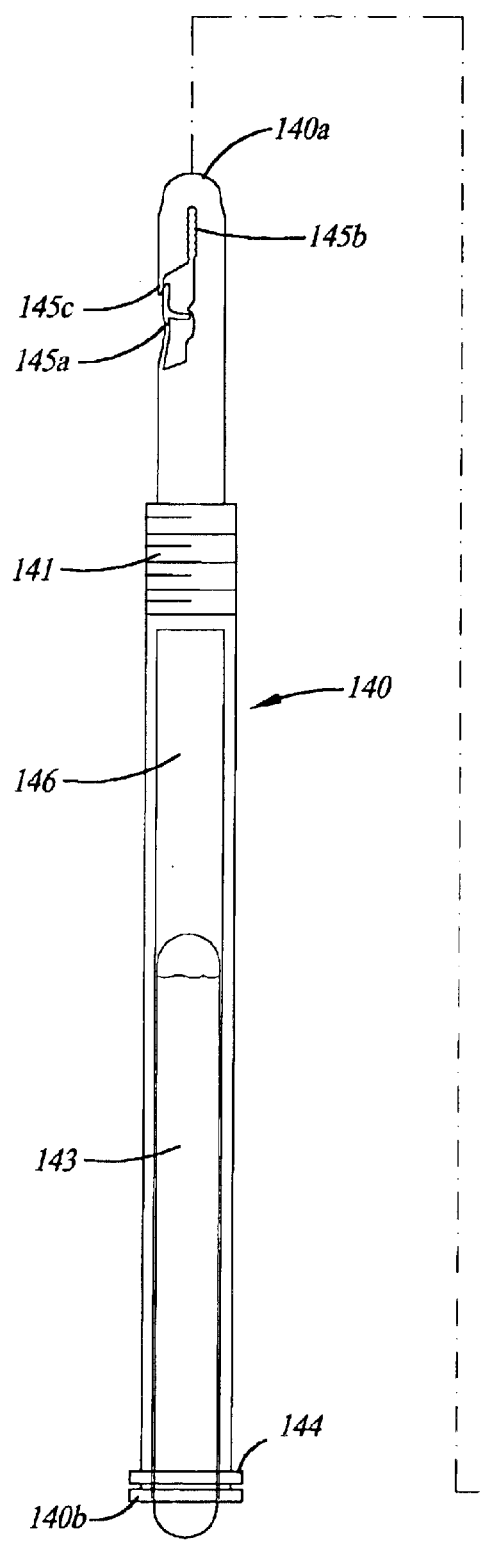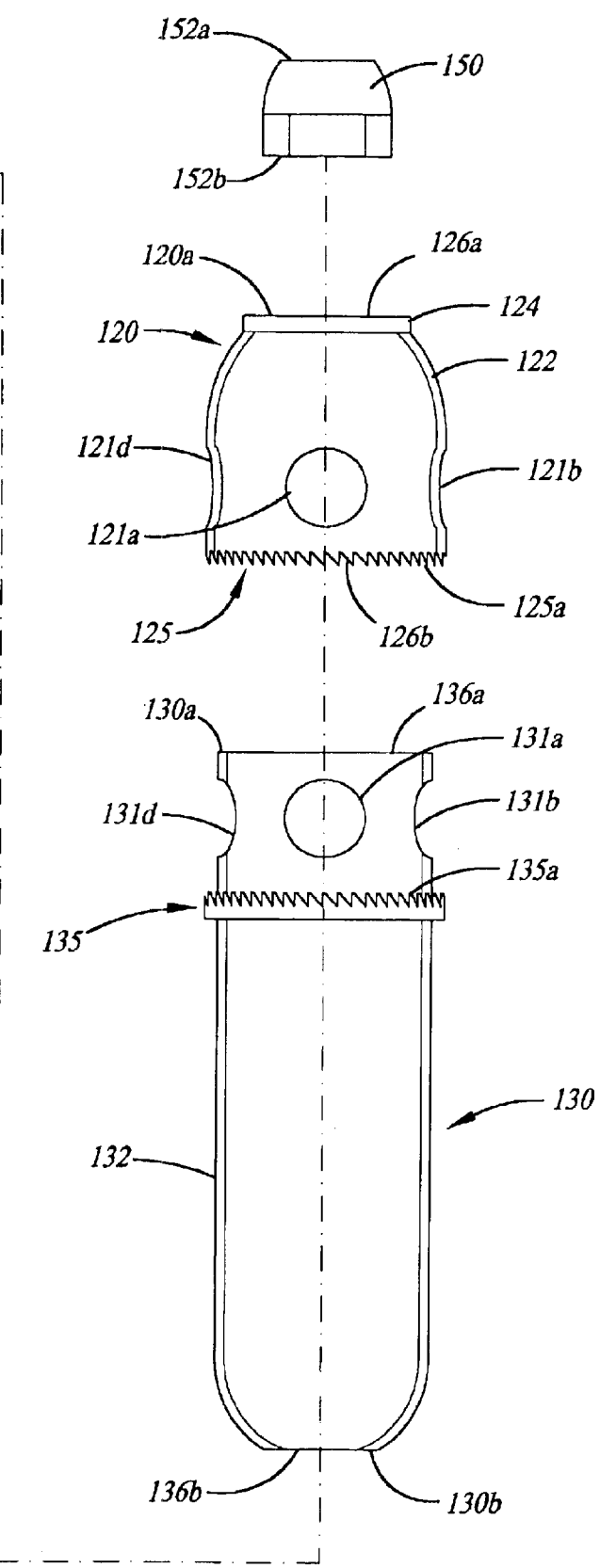
Fig. 10

ADJUSTABLE BUOYANCY FLOATING FISH LURE

FIELD OF THE INVENTION

The present invention relates to an adjustable buoyancy floating fish lure having remote and manual buoyancy adjustments to vary the buoyancy of the fish lure, thereby controlling the water depth the fish lure will attain. The fish lure of the present invention comprises a fore and aft chamber held together by an attaching means and the buoyancy of the fish lure is adjusted by the relative rotation between the fore and aft chambers. The present invention is not limited to a fishing lure, but can also be used to control and maintain the depth of live bait and other lures.

BACKGROUND OF THE INVENTION

Fishing floatation devices have been used for centuries, utilizing cork objects and wood attached to fishing line to serve as bobbers. Such types of bobbers reside on the water surface and are desirable for preventing the hook from becoming caught or snared on the bottom of the body of water. Although conventional bobbers prevent the hooks from catching on rocks or trees located under the surface of the water, their cumbersome size and color is often undesirable to fish. Additionally, since bait typically extends directly beneath the bobber, the hook setting capability is extremely undesirable, in that when a fisherman sets the hook by lifting his/her rod, the bobber moves first before the hook is set. This premature movement of the bobber prior to setting the hook can scare fish away from the hook.

Additionally, fishing sinkers have also been used for many years and are advantageous for casting long distances and preventing the current of moving water from displacing fishing bait from a desired location. Although fishing sinkers have some desirable features, sinkers typically pull the fishing bait or lure to the bottom of the body of water, often causing either or both the sinker and hook to snare or catch against rocks, submerged vegetation, or other various obstacles, which is undesirable.

Other conventional fishing devices have a predetermined buoyancy, but are typically undesirable to fisherman, since the fisherman must keep a large number of these devices in the tackle box due to uncertainty of the needed buoyancy. Also conventional fishing devices for controlling the depth and floatation of live bait or lures have been developed to have buoyancy adjustments to control the depth of the bait or lure in the water, but are often cumbersome, require a large number of complex and cumbersome components, are expensive to manufacture, and their respective appearances repel fish.

Thus, there is a need to provide a fishing device which prevents the hook of the bait or lure from catching on rocks or submerged vegetation on the bottom of bodies of water, is of a discrete size, has a desirable natural appearance for fish, is multi-functional in that it can float on top of the water, sink to the bottom and achieve any depth between the bottom and surface of the body of water, with an easily adjustable buoyancy which can be adjusted remotely, is inexpensive to manufacture, and attracts fish.

SUMMARY OF THE INVENTION

The present invention is directed to a fish lure having buoyancy adjustments and comprising fore and aft chambers connected to one another by an attaching means within the body of the fish lure. The fore and aft chambers are rotatable about a central axis and the attaching means is disposed on that central axis through the body of the fish lure. The relative rotation of the fore and aft chambers will vary the buoyancy of the fish lure. The fore chamber includes a first set of a plurality of buoyancy windows and the aft chamber includes a second set of a plurality of buoyancy windows, such that the first and second set of buoyancy windows are relatively adjustable with respect to one another to create a set of a plurality of valve apertures controlling the air to water ratio within the body of the fish lure.

Additionally, the fish lure of the present invention has buoyancy adjustments comprising fore and aft chambers connected to one another by an attaching means, wherein the fore and aft chambers as well as the attaching means are coaxial with each other about a central axis and a first set of a plurality of buoyancy windows are disposed on and around the circumference of a first end of the aft chamber and a second set of a plurality of buoyancy windows are disposed on and around the circumference of a second end of the fore chamber, wherein the first and second set of buoyancy windows are relatively adjustable to one another to create a set of a plurality of valve apertures controlling the air to water ratio within the fish lure. Additionally, the fore chamber comprises a first annular serrated locking means having a first set of a plurality of angled teeth and the aft chamber comprises a second annular serrated locking means having a second set of a plurality of angled teeth, wherein the first and second sets of annular teeth engage each other to lock the fore and aft chambers in a preferred respective position.

In the preferred embodiment of the present invention the attaching means connecting and holding together the fore and aft chambers is a hollow elastic tube having first and second ends, wherein the fore and aft chambers are held together by rotating the elastic tube about the central axis. Since the hollow elastic tube is disposed on and extends along the central axis, a fishing line continuously extends through the hollow elastic tube on and along the central axis through the body of the fish lure. Both the fore and aft chambers of the fish lure are made of a transparent and colorless plastic.

In a second embodiment of the present invention the attaching means includes a threaded end cap and a hollow rod having first and second ends, the first end has a threaded protrusion and the second end includes an annular flange unit and threaded end cap which rotatably engages the threaded protrusion to connect the fore and aft chambers together. To attract nearby fish, an illumination means can be inserted into the hollow rod. Similar to the fish lure of the preferred embodiment of the present invention, the fore and aft chambers are made of transparent and colorless plastic as well as the threaded end cap and hollow rod to produce a covert natural appearance to fish.

BRIEF DESCRIPTION OF THE DRAWINGS

For the purposes of illustrating the invention, there is shown in the drawings, forms that are presently preferred, it being understood, however, that the invention is not limited to the precise arrangements and instrumentalities shown.

FIG. 1 is a perspective view of the adjustable buoyancy floating fish lure of the present invention.

FIG. 2 is an exploded side view of the adjustable buoyancy floating fish lure of the present invention.

FIG. 3 is a side view of the adjustable buoyancy floating fish lure of the present invention prior to engagement with the fishing line and with the buoyancy windows fully open.

FIG. 4 is a side view of the adjustable buoyancy floating fish lure of the present invention with the fishing line engaged and the buoyancy windows partially closed.

FIG. 5 is a side view of the adjustable buoyancy floating fish lure of the present invention with the fishing line engaged and noisemaking means housed within the body of the lure.

FIG. 6 is a side view of the adjustable buoyancy floating fish lure of the present invention with the fishing line engaged and scent disbursing means housed within the body of the lure.

FIG. 7 is a side view of the adjustable buoyancy floating fish lure of the present invention with the fishing line engaged and reflective attraction means housed within the body of the lure.

FIG. 7A is a side view of the adjustable buoyancy floating fish lure of the present invention with the fishing line engaged, reflective attraction means housed with the body of the lure, a further attraction means attached at one end of the lure and a hook attached along the outer surface of the lure.

FIG. 8 is a side view of the line attachment means of a second embodiment of the adjustable buoyancy floating fish lure of the present invention having an illumination means housed therein.

FIG. 10 is an exploded view of the second embodiment of the adjustable buoyancy floating fish lure of the present invention.

DETAILED DESCRIPTION

Figure 9:
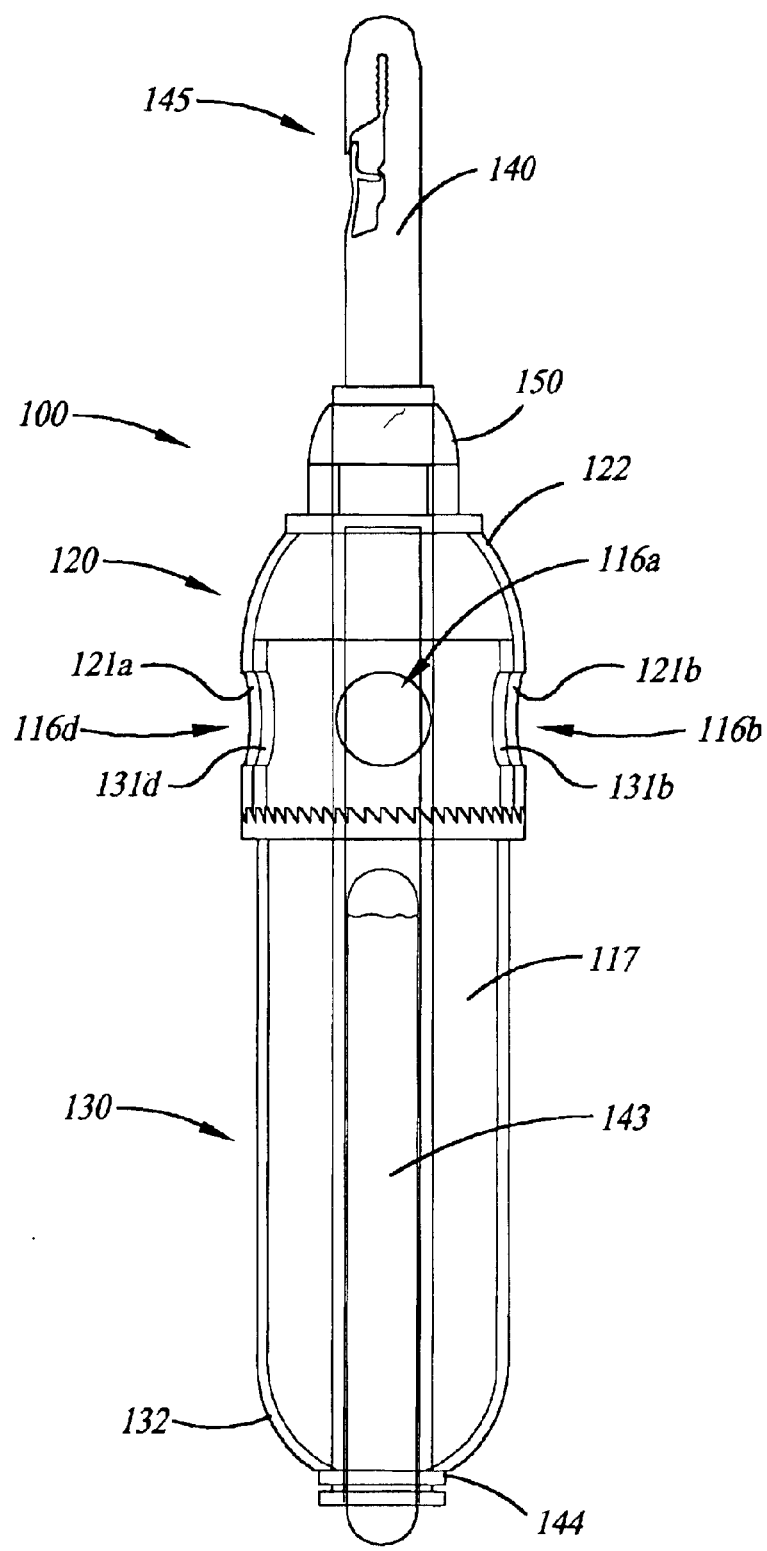
FIG. 9 is a side view of the second embodiment of the adjustable buoyancy floating fishing lure of the present invention prior to engagement with the fishing line, with the illumination means housed within the lure and with the buoyancy windows open.

The following detailed descriptions are for the best presently contemplated modes of carrying out the present invention. These descriptions are not intended in any limiting sense, but rather are made solely for the purposes of illustrating the general principles of the present invention.

Referring now to the drawings in detail, wherein like numerals indicate like elements, there is shown in FIGS. 1 and 2, an adjustable buoyancy floating fish lure 10 having fore and aft chamber sections 20 and 30 embodying the principles of the present invention. Each chamber section 20, 30 is coaxially disposed around a central axis 15 extending entirely through the central portion or chamber 17 of the adjustable buoyancy floating fish lure 10. An elastic tubing 13, such as a rubber surgical tube having a hollow interior bore connects the distal ends of the fore and aft chamber sections 20, 30 such that the elastic tubing 13 extends through the central chamber of body 17 of the fish lure.

The fore and aft chamber sections 20, 30 are preferably made of a transparent and colorless plastic. The light weight of the plastic, and the absence of color, permits the fish lure of the present invention to display a covert natural appearance within the water. A first end 13a of the elastic tubing 13 is affixed to the fore chamber section 20 by a first rivet 12a which is inserted into an opening within the fore chamber section wall 22. The first end 13a of the elastic tubing 13 is disposed around and between the rivet 12a and the fore chamber section wall 22 of the opening in the fore chamber section 20. As such, when the rivet is fully inserted into the opening in the fore chamber section wall 22, the rivet 12a presses the elastic tubing 13 against the fore chamber section wall 22 of the opening in the fore chamber section 20, thereby securely holding the elastic tubing 13 in the desired position. Likewise, a second end 13b of the elastic tubing 13 is affixed to the aft chamber section 30 by a second rivet 12b which is inserted into an opening within the fore chamber section wall 32. The second end 13b of the elastic tubing 13 is disposed around and between the rivet 12b and the aft chamber section wall 32 of the opening in the aft chamber section 30. As such, when the rivet 12b is fully inserted into the opening in the aft chamber section wall 32, the rivet 12b presses the elastic tubing 13 against the aft chamber section wall 32 of the opening in the aft chamber section 30, thereby securely holding the elastic tubing 13 in the desired position.

Upon connecting the fore and aft chamber sections 20, 30 by way of the elastic tubing 13, a fishing line 11 is threaded entirely through the hollow interior of the elastic tubing 13 and first and second rivets 12a and 12b, respectively. As depicted in FIG. 1, first fishing line section 11a of the fishing line extends towards the fisherman or the fishing rod and reel assembly (not shown) and a second fishing line section 11b of the fishing line extends towards a hook or additional fishing lure.

Positioned around the circumference of the fore chamber section 20 of the present invention are buoyancy windows 21a–d preferably being circular in shape and extending entirely through the fore chamber section wall 22. Each buoyancy window is positioned along the fore chamber section wall 22 at equally spaced distances so that each buoyancy window 21a–d is separated 90 degrees along the circumference from the next buoyancy window. Thus, buoyancy windows 21a–d are equidistantly spaced about the fore chamber section wall 22 at angles of 90, 180, 270 and 360 degrees when measured about the central axis 15. Similarly, buoyancy windows 31a–d of the aft chamber section 30 are equidistantly spaced about the aft chamber section wall 32 at angles of 90, 180, 270 and 360 degrees when measured about the central axis 15.

A critical feature of the present invention is the corresponding relationship between the buoyancy windows 21a–d of the fore chamber section 20 and the buoyancy windows 31a–d of the aft chamber section 30 so as to adjust the buoyancy of, or air to water ratio within, the floating fishing lure 10. The variable buoyancy of the present invention is achieved when a buoyancy window, such as 21a of the fore chamber section 20 overlies the buoyancy window 31a of the aft chamber section 30. As depicted in FIG. 3, buoyancy window 21a and 31a completely coincide and overlie each other and, as such, both buoyancy windows are fully aligned to create aperture valves 16a–d having a maximum opening area. By setting the valve apertures 16a–d to have maximum opening areas, as depicted in FIG. 3, the floating fish lure 10 of the present invention will take on water through the valve apertures 16a–d filling the interior chamber 17 with water and causing the fish lure 10 to sink beneath the surface of the water. Since buoyancy windows 21a–d and 31a–d are equidistantly spaced about the central axis 15, the size of the valve aperture, or opening area, created by one of buoyancy windows of the fore chamber section 20 coinciding with the opening of a buoyancy window of the aft chamber section 30 will be of equal size for the other three remaining valve apertures.

Alternatively, to increase the buoyancy of the fishing lure 10 of the present invention, the size or area of the aperture valves 16*a–d* must be reduced as clearly depicted in FIG. 4. By reducing the size of the aperture valves, less water is accepted into the interior chamber 17 therefore allowing more air to remain within the interior chamber 17 so as to maintain a greater buoyancy. For instance, buoyancy window 21*a* of the fore chamber section 20 only partially overlies the buoyancy window 31*a* of the aft chamber section 30, thereby creating a relatively small aperture valve 16*a* compared to the aperture valve as depicted in FIG. 3. Although not shown in the drawings, to cause the fish lure 10 of the present invention to act as a bobber and always float on top of the surface of the water, the fore and aft chamber sections 20, 30 may be positioned relative to each other so that none of the buoyancy windows 21*a–d* and 31*a–d* overlie one another, resulting in the valve apertures being closed. With the valve apertures closed, water is incapable of entering the interior chamber 17 and the air within the interior chamber is incapable of escaping, thereby the fish lure 10 of the present invention will float on top of the surface of the water.

As described above, the fore and aft chamber sections 20, 30 of the present invention are held in overlapping contact by elastic tubing 13. The tubing 13 of the present invention has multiple advantages in that due to the hollow interior of the elastic tubing 13 the fishing line 11 can be completely inserted from the first end 13*a* to the second end 13*b* of the elastic tubing 13 and, by turning the fore chamber section 20 with respect to the aft chamber section 30, thereby twisting the elastic tubing 13, the fishing line 11 is captured and held in place within the elastic tubing 13 fixedly positioning the fish lure 10 at a predetermined distance along the fishing line 11. A more critical feature of the elastic tube 13 is the ability to produce a contracting force to pull the fore and aft chamber sections 20, 30 together by the twisting of the elastic tubing 13 about the central axis 15.

Positioned on proximal end of the fore chamber section 20, opposite the distal end where rivet 12*a* is located, is a first annular serrated locking means 25 disposed along the edge of and integrally formed as part of the fore chamber section wall 22. The serrated locking means 25 extends outwardly away from the fore chamber section 20. Similarly positioned on the proximal end of the aft chamber section wall 32, opposite the distal end where rivet 12*b* and the buoyancy windows 31*a–d* are located, is a second annular serrated locking means 35 which also extends outwardly away from the aft chamber section 30. Both first and second annular serrated locking means 25, 35 have the same diameter relative to the central axis 15 and each have a set of a plurality of teeth 25*a*, 35*a* which extend outwardly away from the fore and aft chamber sections 20, 30 at interlocking angles.

Together with elastic tubing 13, the first and second annular serrated locking means 25, 35 enable a user to adjust the buoyancy of the fish lure 10 with a relatively high degree of precision. By increasing the number of teeth 25*a*, 35*a* extending around the first and second annular serrated locking means 25, 35; the precision of buoyancy can also be increased. Likewise, reducing the number of teeth of the annular serrated locking means reduces the adjustable precision of buoyancy adjustment. Although not shown in the drawings, indicia positioned around the circumference of the either the fore or aft chamber section 20, 30 can conceivably be incorporated thereon to indicate degrees of buoyancy, thereby enabling the user to easily adjust to a desired buoyancy.

The initial set up of the present invention begins with the insertion of the fishing line 11 into and through the elastic tubing 13. Upon insertion of the fishing line 11 through the fish lure 10, a user separates the fore chamber section 20 from the aft chamber section 30 by pulling each chamber in opposing directions along the central axis 15. Once the fore and aft chamber sections 20, 30 are separated, the elastic tubing 13 is twisted about the central axis 15 by rotating one of the fore or aft chamber sections 20, 30 relative to the other. Although the elastic tubing 13 can be twisted in an arbitrary direction, the tube is preferably twisted in such a direction so that the teeth 25*a* of the first annular serrated locking means 25 rotatably engage recesses between the teeth 35*a* of the second annular serrated locking means 35. Thus, the elastic tubing 13 securely holds the fore and aft chamber sections 20, 30 together by not only producing a contracting force caused by the twisting of elastic tubing 13, which forces the fore and aft chamber sections 20, 30 together, but also produces a rotational force about the central axis 15 for engaging teeth 25*a*, 35*a* of the serrated locking means 25, 35 located respectively on the fore and aft chamber sections 20, 30.

An additional advantageous feature of the present invention is the method of manually, and remotely adjusting the buoyancy of the floating fish lure 10 of the present invention. Although the present invention is referred to as a floating fish lure 10, it is not limited to such, since the present invention is a multi-functioning device, in that it facilitates the placement of other fishing lures and baits through its variable buoyancy. The floating fish lure 10 is able to function as a sinker, bobber or a buoyant facilitator to enable fishing lures and baits to attain any level of buoyancy equilibrium between the fish lure 10 and the ambient water, thereby producing a natural appearance and an adjustable level of depth in the water.

As described above, the method of manually adjusting the degree of buoyancy is controlled by adjusting the coincident overlying relationship between the buoyancy windows 21*a–d* and 31*a–d* to produce the desired opening size of the aperture valves 16*a–d*, such that the larger the opening size of the aperture valves 16*a–d*, the less buoyant the fish lure 10. Conversely, the smaller the opening size of the aperture valves 16*a–d*, the higher degree of buoyancy the fish lure 10 will attain. For instance, consider the case where the valve apertures 16*a–d* of the present invention are set to have a maximum opening. In this condition, upon casting the fish lure 10 into a body of water, the interior chamber 17 will fill with water causing the fish lure 10 to sink towards the bottom of the body of water due to the maximum sized valve apertures 16*a–d* permitting the intake of a greater amount of water over a shorter time. Alternatively, consider the case where the valve apertures 16*a–d* of the present invention are closed thereby prohibiting any amount of water passing through the valve apertures 16*a–d* and into the interior chamber 17. In this condition, the fish lure 10 will act as a bobber floating on the surface of the water. Located between these extreme conditions of the size of valve apertures 16*a–d* either being fully open or completely closed, are a large number of degrees of buoyancy settings limited only by the number of teeth 25*a*, 35*a* of the first and second annular serrated locking means 25, 35. The buoyancy of the fish lure 10 is determined by the air to water ratio within the interior chamber 17, such that the larger the amount of air, the more buoyant the fish lure becomes and conversely, the larger the amount of water versus air within the interior chamber 17, the less buoyant the fish lure becomes. With the large number of degrees of buoyancy, a fisherman can choose just about any desired level of buoyancy.

In the situation where the fisherman is aware that the fish are feeding near the bottom of the body of water, the fisherman would set the valve apertures 16a–d somewhere between maximum size and half-size. Continuing along the same manners of adjustments, through trial and error, the fisherman can attain the precise degree of desired buoyancy.

An additional advantageous feature of the present invention is the method of remotely adjusting the buoyancy of the fish lure 10 while the figure lure 10 is within the water. In the situation where the fisherman is aware of the presence of fish feeding in the area, but is unaware of the particular depth the fish are located, a fisherman is capable of gradually reducing the buoyancy of the fish lure by remotely jerking or jigging the lure, which forces water through the valve apertures 16a–d and into the interior chamber 17. This causes the air retained in the chamber 17 to bubble out and water to come into the chamber, thereby causing the fish lure 10 to sink to a slightly lower depth. For instance, with the valve apertures 16a–d partially closed, the fish lure 10 is cast out into a body of water. Upon landing on the surface of the water, the fish lure 10 floats on top of the surface of water acting as a bobber. If the fisherman is unsuccessful in receiving any strikes from fish, the fisherman simply lightly jerks or jigs the fish lure 10, thereby forcing a small amount of water through the valve apertures 16a–d displacing and forcing air out of the chamber 17. The newly added amount of water entering through the valve apertures 16a–d and into the interior chamber 17, increases the weight of the fish lure 10, thereby reducing the buoyancy to a small degree and causing the fish lure 10 to sink to a slightly lower depth beneath the surface of the water. Additional slight jerks or jigs cause a tipping of the fish lure 10 permitting more water into the interior chamber 17, causing the fish lure to sink to an even slightly deeper depth. This procedure is carried out until the fisherman approximates the appropriate depth at which the fish are feeding. By refraining from severe motions on the fish lure 10, the lure will tend to retain its current buoyant state.

Alternatively, once the specific feeding depth is determined, the fisherman can retrieve the fish lure 10, manually fill the interior chamber 17 with the appropriate amount of water to achieve the newly discovered degree of buoyancy for the fish lure. With the interior chamber 17 manually filled with water, the fisherman simply closes the valve apertures 16a–d, thereby prohibiting the water from escaping out of the interior chamber 17 and again casts out into the body of water with the fish lure 10 set to the recently discovered degree of buoyancy.

To aid the fisherman in determining the amount of water to add to the interior chamber 17 of the fish lure 10, a first set of indicia markings (not shown) representing degrees of buoyancy are disposed on the aft chamber section 30 and serve as fill lines for the fisherman. To achieve a particular degree of buoyancy, the fisherman simply adds water to the interior chamber 17 of the aft chamber section 30 until the desired degree of buoyancy is attained. Similarly, a second set of indicia markings (not shown) may be also placed on either the fore or aft chamber sections 20, 30 to indicate degrees of buoyancy when adjusting the size of the valve apertures 16a–d. Both first and second sets of indicia markings may be used together to determine the appropriate buoyancy required for the fish lure 10 to reach the desired feeding depth.

As depicted in FIGS. 5–7, the adjustable buoyancy floating fish lure 10 of the present invention can incorporate additional features to increase the desirability of the lure to fish. One such feature as illustrated in FIG. 5 are noisemaking members 18a disposed within the interior chamber 17 of the fish lure 10. These noisemaking member 18a are preferably made of plastic, but can conceivably be made of other various materials to aid in contributing to the production of potentially desirable noises, provided the noisemaking members 18a do not adversely affect the overall buoyancy of the fish lure 10. To insert the noisemaking members 18a into the interior chamber 17 of the fish lure, fore and aft chamber sections 20, 30 are separated and the noisemaking members 18a are inserted through the proximal opening 36 of the aft chamber section 30. Upon movement of the fish lure 10 of the present invention, the noisemaking members contact both the fore and aft chamber section walls 22, 32 to produce rattling noises which will attract the attention of nearby fish.

Also used to attract the attention of fish are scent dispersing means 18b as shown in FIG. 6. The scent dispersing means 18b may also be inserted into the interior chamber 17 of the fish lure 10. A number of different types and materials of scent dispersing means 18b can be used within the fish lure 10 provided the scent dispersing means 18b do not adversely affect the intended functions of the fish lure 10, such as its adjustable buoyancy. To insert the scent dispersing means 18b into the interior chamber 17 of the fish lure, fore and aft chamber sections 20, 30 are separated and the scent dispersing means 18b may be inserted through the proximal opening 36 of the aft chamber section 30. The scent from the scent dispersing means 18b emanating from within the interior chamber 17 of the fish lure 10 seeps out and through the aperture valves 16a–d and acts as a fish attractant for nearby fish.

As illustrated in FIG. 7, disposed within the interior chamber 17 of the fish lure 10 is a reflective attraction means 18c that acts to reflect light either in general, or predetermined patterns. A variety of different types of reflective attraction means 18c are conceivable, such as but not limited to, thin metallic film such as aluminum foil, stickers or paper mediums having reflective designs replicating fish scales disposed on a surface of the medium. To insert the reflective attraction means 18c into the interior chamber 17 of the fish lure, fore and aft chamber sections 20, 30 are separated and the reflective attraction means 18c is inserted through the proximal aperture 36 of the aft chamber section 30. Flashes of light caused by the slight movement of the fish lure 10 within the water attract the attention of nearby fish.

Additional features can further be incorporated onto the fish lure 10 of the present invention to attract nearby fish, such as a skirt 19 that produces additional motion proximate to the fish lure 10. The skirt 19 is disposed around rivet 12b on the distal end of aft chamber section 30 and extending outwardly and away from the fish lure 10. In order to take advantage of the situation where a fish may strike the fish lure 10 of the present invention, a hook assembly 14 is attached along the outer surface of the aft chamber section 30. Eyelet 14a can be affixed to aft chamber section 30 through conventional plastic welding means, or more preferably is made integrally as a unit with the aft chamber section 30 to assure a secure attachment. A conventional hook 14c is connected to the eyelet 14a through a link unit 14b that is of sufficient strength to prohibit breakage under normal fishing conditions. Although the above additional fish attraction features are described separately, such features can be used separately or together, or in any conceivable combination, to attract fish, provided that such combination of features enables the fish lure 10 to carry out its intended function of adjustable buoyancy.

FIGS. 8–10 illustrate the adjustable buoyancy floating fish lure 100 of the second embodiment of the present invention, wherein a hollow attaching rod 140 is centrally disposed through fore and aft chamber sections 120, 130 that is held in position by threaded end cap 150. The fore and aft chamber sections 120, 130, as well as the hollow attaching rod 140 and threaded end cap 150, are all preferably made of a transparent and colorless plastic which, due to the light weight of plastic and the absence of color, permits the fish lure of the present invention to display a covert natural appearance beneath the surface of the water.

As illustrated in FIG. 8, the hollow attaching rod 140 of the second embodiment of the present invention has first and second ends 140*a* and 140*b*, respectively. Strategically positioned at the first end 140*a* of the hollow attaching rod 140 is a line attachment means 145. Unlike the first embodiment of the present invention, fish lure 100 connects to the fishing line (not shown in FIGS. 8–10) by way of a serrated gripping unit 145*b* of the line attachment means 145. The fishing line is pressed against a resilient locking unit 145*a* that flexes inwardly toward the center of the hollow attaching rod 140. Upon flexing, the displacement of the resilient locking unit 145*a* creates a small gap between itself and rigid lip 145*c*, thereby enabling the fishing line to pass through the gap. After the fishing line passes through the gap, the resilient locking unit 145*a* returns to its initial position such that the resilient lock unit 145*a* abuts against the rigid lip 145*c* preventing the fishing line from escaping from the line attachment means 145. The fishing line is then forced into the serrated gripping unit 145*b* of the attaching rod 140 so that the fishing lure 100 is securely held in position on the fishing line.

The hollow attaching rod 140 of the present invention has an interior bore 146 disposed within the hollow attaching rod 140 which is sized to house an illumination means 143. The illumination means 143 can conceivably be any illumination source, provided the illumination source is capable of fitting within the interior bore 146 of the hollow attaching rod 140, remains illuminated for a sufficient period of time, for example one to two hours, and also does not adversely affect the adjustable buoyancy of the fish lure 100. Preferably, the illumination source may be single use, or reusable light sticks. Placing them in low temperature environments, i.e. freezers, for future use, can reactivate the reusable light sticks 143. Located at the second end 140*b* of the hollow attaching rod 140 is an annular flange 144 that is preferably made integrally with the hollow attaching member 140. Although not clearly illustrated in FIGS. 8–10, the annular flange 144 has a bore equal in diameter and coaxially aligned with the interior bore 146 of the hollow attaching rod 140. Illumination means 143, being slightly smaller in diameter than the interior bore 146 of the hollow attaching rod 140, is pushed into the interior bore 146 to the desired depth, and snugly held within the interior bore 146 of the hollow attaching rod 140 by a frictional fit until removed.

The fore and aft chamber sections 120, 130 of the second embodiment of the present invention are different than the fore and aft chamber sections 20, 30 of first embodiment of present invention. The fore chamber section 120 and the aft chamber section 130 have coaxially first and second apertures 126*a*, 126*b*, and 136*a*, 136*b*, respectively. Apertures 126*a*, 126*b*, 136*a* and 136*b* enable the hollow attaching rod 140 to initially pass through second then first apertures 136*b* and 136*a* on the aft chamber section 130 and extend towards and pass through the second then first apertures 126*b* and 126*a* of the fore chamber section 120. Strategically positioned on the hollow attaching rod 140, is a threaded portion 141 which protrudes through aperture 126*a* on the fore chamber section. When the hollow attaching rod 140 is fully inserted through apertures 126*a*, 126*b*, 136*a* and 136*b* of the fore and aft chamber sections 120, 130, about a central axis 115 of the fish lure 100, the threaded portion 141 extends beyond the fore chamber section 120. See FIGS. 9, 10. Threaded end cap 150 having a bore sized to accommodate the first end 140*a* of the hollow attaching rod 140 is placed over the line attachment means 145 and slid down the attaching rod 140 to engage the threaded portion 141. By rotating the threaded end cap 150 downward, the threaded portion 141 of the hollow attaching rod 140 directly engages the threads within the bore of the threaded end cap 150. This action exerts a force not only upon an annular rim 124 positioned on the first end 120*a* of the fore chamber section 120, but also on the second end 130*b* of the aft chamber section 130, by way of annular flange unit 144 of the hollow attaching rod 140. As such, the rotation of the threaded end cap 150 forces both the fore and aft chamber sections 120, 130 into direct engagement within one another.

Similar to the first embodiment of the present invention, positioned around the fore chamber section 120 of the second embodiment of the present invention are buoyancy windows 121*a–d* preferably being circular in shape and extending entirely through the fore chamber section wall 122. Each buoyancy window 121*a–d* is positioned along the fore chamber section wall 122 at equally spaced distances around the periphery such that each buoyancy window 121 is positioned 90 degrees apart from the next buoyancy window 121. Thus, buoyancy windows 121*a–d* are equidistantly spaced about the fore chamber section wall 122 at angles of 90, 180, 270 and 360 degrees when measured about the central axis 115. Similarly, buoyancy windows 131*a–d* of the aft chamber section 130 are equidistantly spaced about the aft chamber section wall 132 at angles of 90, 180, 270 and 360 degrees when measured about the central axis 115.

A critical feature of the present invention is the coincident overlying relationship between the buoyancy windows 121*a–d* of the fore chamber section 120 and the buoyancy windows 131*a–d* of the aft chamber section 130 to adjust the buoyancy or weight of the floating fishing lure 100. The variably buoyancy of the present invention is achieved when a buoyancy window, such as 121*a* of the fore chamber section 120 overlies the buoyancy chamber 131*a* of the aft chamber section 130. Buoyancy windows 121*a* and 131*a* completely overlie and are coincident with each other and as such both buoyancy windows are aligned to create aperture valves 116*a–d* having a maximum opening area. By setting the valve apertures 116*a–d* to have maximum area openings as depicted FIGS. 9 and 9*a*, the floating fish lure 100 of the present invention takes on water through the valve apertures 116*a–d* filling the interior chamber 117 with water and causing the fish lure 100 to sink beneath the surface of the water. Since buoyancy windows 121*a–d* and 131*a–d* are equidistantly spaced about the periphery of the fore and aft chamber sections 120, 130, the size of the valve aperture opening created by one buoyancy window of the fore chamber section 120 partially or completely overlying a buoyancy window of the aft chamber section 130 will cause the opening to be of equal size for the other three remaining valve apertures.

Figure 9A:
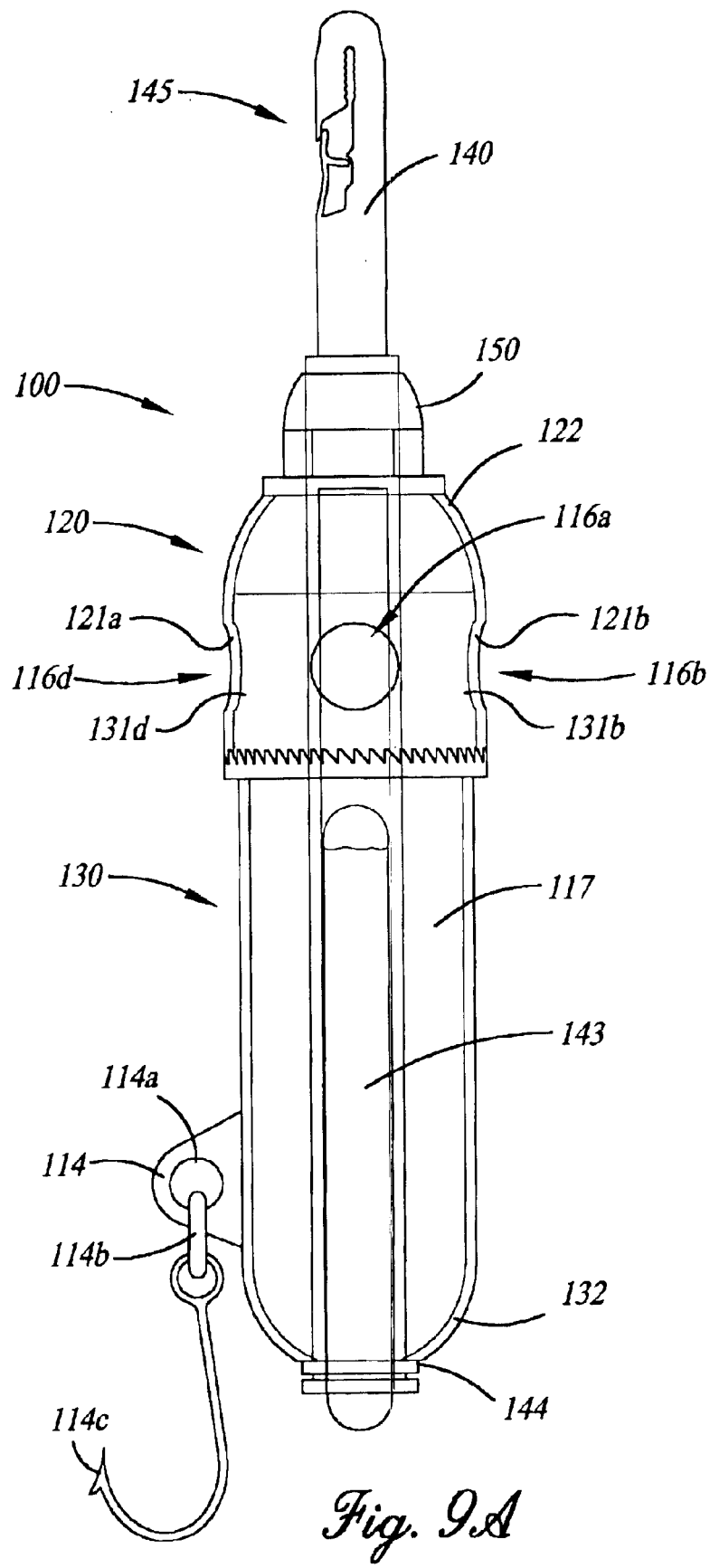
FIG. 9A is a side view of the adjustable buoyancy floating fish lure of the present invention prior to engagement with the fishing line, with the illumination means housed within the lure, with the buoyancy windows open, and a hook attached along the outer surface of the lure.

Alternatively, to increase the buoyancy of the fishing lure 100 of the present invention, the size or area of the valve aperture openings 116*a–d* must be reduced as described above with respect to the first embodiment of the present invention as depicted in FIG. 4. By reducing the size of the aperture valve openings, less water is accepted into the interior chamber 117, therefore allowing more air to remain within the interior chamber 117. For instance, in the situation where the buoyancy window 121a of the fore chamber section 120 only partially overlies the buoyancy window 131a of the aft chamber section 130, a relatively small valve aperture opening 116a is created when compared to the aperture valve opening 116a as depicted in FIGS. 9 and 9a. Although not shown in the drawings, to cause the fish lure of the present invention to act as a bobber and always float on top of the surface of the water, the fore and aft chamber sections 120, 130 are positioned relative to each other so that neither buoyancy windows 121a–d and 131a–d overlie one another, thereby failing to create an valve aperture opening. Without a valve aperture opening in the present invention, water is incapable of entering the interior chamber 117 and the air within the interior chamber 117 is incapable of escaping, thereby causing the fish lure 10 of the present invention to float on top of the surface of the water.

As described above, the fore and aft chamber sections 120, 130 of the second embodiment of the present invention are held in proximal contact by the combined elements of the hollow attaching rod 140 and threaded end cap 150. The second embodiment of the present invention has multiple advantages, in that the buoyancy of the fish lure 100 is easily adjusted by releasing the threaded end cap 150 and modifying the relative coincident overlie of the buoyancy windows 121, 131 of the fore and aft chamber sections 120, 130. Additionally, the threaded end cap 150 and threaded portion 141 of the hollow threaded rod 140 are capable of producing a strong contraction force to pull the fore and aft chamber sections 120, 130 together by tightening the threaded end cap 150 against the annular rim 124 of the fore chamber section 120.

Positioned on the proximal end 120b of the fore chamber section 120 is a first annular serrated locking means 125 integrally formed as part of internal edge of the fore chamber section wall 122 and extending outwardly away from the fore chamber 120. Similarly positioned on the exterior surface of the aft chamber section wall 132 between the proximal and distal ends 130a, 130b is a second annular serrated locking means 135 integrally formed as part of internal edge of the fore chamber section wall 132 and extending outwardly away from the aft chamber section 130. Both first and second annular serrated locking means 125, 135 are equal in diameter and have a plurality of teeth 125a, 135a which outwardly extend away from the fore and aft chamber sections 120, 130 at interlocking angles.

Together with the threaded end cap 150 and hollow attaching rod 140, the first and second annular serrated locking means 125, 135 enable a user to adjust the buoyancy of the fish lure 100 with a relatively high degree of precision. By increasing the number of teeth 125a, 135a for the first and second annular serrated locking means 125, 135, the precision of buoyancy can also be increased. Likewise, reducing the number of teeth of the annular serrated locking means reduces the precision of buoyancy adjustment. Although not shown in the drawings, indicia positioned around the circumference of the either the fore or aft chamber sections 120, 130 can conceivably be incorporated to indicate degrees of buoyancy, thereby enabling the user to easily adjust the fishing lure 100 to a desired buoyancy.

The initial set up of the fishing lure 100 of the second embodiment of the present invention begins with the insertion of the illumination means 143 into the interior bore 146 of the hollow attaching rod 140 the desired distance so that the light means 143 is held snugly in place by a friction fit. Prior to inserting the hollow attaching rod 140 through the fore and aft chamber sections 120, 130 a buoyancy setting may be determined. By setting the coincident overlie of the buoyancy windows 121a–d and 131a–d to produce valve aperture openings 116a–d of the desired size, the preferred degree of buoyancy for the fishing lure 100 is attained. The fore and aft chamber sections 120, 130 are temporarily held together by abutting the first and second annular serrated locking means 125, 135 so that the buoyancy windows 121a–d and 131a–d can be set to overlie each respective other by the desired amount.

Once the desired buoyancy setting is attained and the illumination means 143 is fully secured to the hollow attaching rod 140, the first end 140a of the hollow attaching rod 140 is inserted entirely through the distal and proximal apertures 136b and 136a of the aft chamber section 130 and also inserted entirely through the distal and proximal apertures 126b and 126a of the fore chamber section 120. After inserting the first end 140a of the hollow attaching rod 140 through both fore and aft chambers 120, 130, threaded end cap 150 is placed over the first end 140a of the hollow attaching rod 140 so as to directly engage the threaded portion 141 of the hollow attaching rod 140. Upon rotation of the threaded end cap 150 about the central axis 115, the threaded end cap 150 is tightened against the annular rim 124 on the fore chamber section 120. Further tightening of the threaded end cap 150 upon the threaded portion 141 causes the annular flange 144 to be drawn towards and abut against the distal end 130b of the aft chamber section 130. Additional tightening of the threaded end cap 150 causes the annular flange 144 and the threaded end cap 150 to force together the first and second annular serrated locking means 125, 135 and tightly seal distal aperture 136b of the aft chamber section 130 and the proximal aperture 126a of the fore chamber section 120 to securely hold the fore and aft chamber sections 120, 130 together.

The tightening of the threaded end cap 150 draws both the fore and aft chamber sections 120, 130 together, thereby causing the plurality of teeth 125a of the first annular serrated locking means 125 to directly engage recesses between the plurality of teeth 135a of the second annular serrated locking means 135. The combination of the threaded end cap 150 and the hollow attaching rod 140 securely hold the fore and aft chamber sections 120, 130 together not only by a contraction force caused by relative rotation about the central axis between the threaded end cap 150 and the hollow attaching rod 140, but also by the interlocking relationship of the plurality of teeth 125a of the fore chamber section 120 directly engaging the recesses between the plurality of teeth 135a of the aft chamber section 130.

Perhaps the most critical feature of the second embodiment of the present invention is the method of adjusting the buoyancy of the fishing lure 100 of the present invention, either manually or remotely. Although the present invention is referred to as a fish lure, it is not limited to such, since the present invention is a multi-functioning device, in that it facilitates the placement of other fishing lures and baits through its variable buoyancy. The fish lure 100 is able to function as a sinker, bobber or a buoyant facilitator to enable fishing lures and baits to attain any level of buoyancy equilibrium between the fishing lure 100 and the water, thereby producing a natural appearance.

As described above, the method of manually adjusting the degree of buoyancy is controlled by adjusting the coincident overlying relationship between the buoyancy windows 121a–d and 131a–d to produce a specific size of aperture valve openings 116a–d, such that the larger the size of the aperture valve openings 116a–d, the less buoyant the fishing lure 100 will be. Conversely, the smaller the size of the aperture valve openings 116a–d, the higher degree of buoyancy the fish lure 100 will attain. For instance, consider the case where the aperture valve openings 116a–d of the present invention are set to have a maximum opening. In such a situation, upon casting the fish lure 100 into a body of water, the interior chamber 117 will shortly fill with water, causing the fish lure 100 to sink towards the bottom of the body of water due to the maximum sized aperture valve openings 116a–d permitting the intake of a relatively large amount of water. Alternatively, consider the case where the aperture valve openings 116a–d of the present invention are closed thereby prohibiting any amount of water passing through the valve apertures 16a–d and into the interior chamber 117. In such a situation, the fish lure would act as a bobber floating on the surface of the water. Located between the extremes of the valve aperture openings 116a–d, either being fully open or completely closed, are a large number of degrees of buoyancy settings only limited by the number of teeth 125a, 135a of the first and second annular serrated locking means 125, 135. Within such a large number of degrees of buoyancy, a fisherman can choose almost any desired level of buoyancy. In the situation where the fisherman is aware that the fish are feeding near the bottom of the body of water, the fisherman can set the aperture valve openings 116a–d somewhere between maximum size and half-size. Continuing along the same manners of adjustments, the fisherman can attain the precise degree of desired buoyancy.

An additional advantageous feature of the present invention is the method of remotely adjusting the buoyancy of the fishing lure 100 while in the water. In the situation where the fisherman is aware of the presence of fish feeding in the area, but is unaware of the particular depth the fish are located, the fishing lure 100 is capable of gradually reducing the buoyancy of the lure by jerking or jigging the lure, thereby forcing water through the aperture valve openings 116a–d and into the interior chamber 117, causing the fish lure 100 to sink to a lower depth. For instance, with the aperture valve openings 116a–d partially closed, the fish lure 100 is cast out into a body of water. Upon landing on the surface of the water, the fish lure 100 floats on top of the surface of water acting as a bobber. If the fisherman is unsuccessful in receiving any strikes from fish, the fisherman simply lightly jerks or jigs the fish lure 100, thereby forcing a small amount of water through the valve aperture openings 116a–d and into the chamber 117. The newly added amount of water entering through the valve apertures 116a–d and into the interior chamber 117, increases the weight of the fish lure 100, thereby reducing the buoyancy to a small degree and causing the fish lure 100 to sink to a slightly lower depth beneath the surface of the water. Additional slight jerks or jigs force more water into the interior chamber, causing the fish lure to sink to an even slightly deeper depth. This procedure is carried out until the fisherman determines the appropriate depth the fish are feeding at. Once the specific feeding depth is determined, the fisherman can retrieve the fish lure 100 and manually fill the interior chamber 117 with the appropriate amount of water to achieve the newly discovered degree of buoyancy for the fish lure. Once the interior chamber is manually filled, the fisherman simply closes the valve apertures 116a–d, thereby prohibiting the interexchange of water and air from escaping from the interior chamber 117 and again casts out into the body of water with the fishing lure 100 set to the desired degree of buoyancy.

To aid the fisherman in determining the amount of water to add to the interior chamber 117 of the fishing lure 100, a first set of indicia markings (not shown) representing degrees of buoyancy may be disposed on the aft chamber section 130 and serve as fill lines for the fisherman. To achieve a particular degree of buoyancy, the fisherman simply adds water to the interior chamber 117 of the aft chamber section 130 until the water level reaches the desired fill line thereby achieving the desired degree of buoyancy. Similarly, a second set of indicia markings (not shown) may be placed on either the fore or aft chamber sections 120, 130 indicating degrees of buoyancy when adjusting the size of the valve apertures 116a–d. Both first and second sets of indicia markings can be used together to determine the appropriate buoyancy required to reach the desired feeding depth.

As described above with respect to the first embodiment of the present invention, fishing lure 100 of the second embodiment of the present invention can also incorporate such additional features to possibly increase the desirability of the lure to fish as shown in FIGS. 5–7, provided the incorporation of the above mentioned additional features do not adversely affect either the functionality of the fish lure 100 or the adjustability of the buoyancy.

As illustrated in FIG. 9a, in the case where the fisherman wishes to take advantage of the situation where a fish may strike the fishing lure 100 of the present invention, a hook assembly 114 is attached on a surface of the aft chamber section 130. Eyelet 114a can be affixed to aft chamber section 130 through conventional plastic welding or more preferably made integrally as a unit with the aft chamber section 130 to assure a secure attachment. A conventional hook 114c is connected to the eyelet 114a through a link 114b that is of sufficient strength to prohibit breakage under normal fishing conditions. Although the above additional fish attraction features are described separately, such features can be used together in any conceivable combination to attract fish.

The present invention may be embodied in other specific forms without departing from the spirit or essential attributes thereof and, accordingly, the described embodiments are to be considered in all respects as being illustrative and not restrictive, with the scope of the invention as well as all modifications which may fall within a range of equivalency which are also intended to be embraced therein.

What is claimed is:

1. A fish lure having an adjustable buoyancy chamber comprising fore and aft chamber portions connected to one another by an attaching means, said fore and aft chamber portions being co-axially aligned about a central axis, said fore chamber portion includes a first set of a plurality of buoyancy windows and said aft chamber portion includes a second set of a plurality of buoyancy windows, both sets of buoyancy windows being arrayed along the outer wall of each chamber portion and cooperatively positioned to overlie one another, said sets of buoyancy windows are relatively adjustable to one another to create a plurality of valve-like apertures when the buoyancy windows of each set at least partially overlie one another for controlling the air to water ratio within the buoyancy chamber by the rotation of one chamber portion about the other, a means for locking the fore and aft chamber portions in a desired rotational position to selectively size the valve-like apertures between the chamber portions and set the air to water ratio within the buoyancy chamber, said means for locking is a plurality of cooperatively engaging teeth opposingly positioned along juxtaposed annular segments of the fore and aft chamber portions that, when engaged at a desired position, retain the valve-like apertures between the chamber portions in the selected alignment, said attaching means disposed along the central axis between distal ends of each chamber portion, wherein the relative rotation of the fore and aft chamber portions about the central axis varies the buoyancy of the fish lure by increasing or decreasing the size of the valve-like apertures between the chamber portions.

2. The fish lure of claim 1, wherein the fore and aft chamber portions are of a transparent colorless plastic.

3. The fish lure of in claim 1, wherein the means for attaching the fore and aft chamber portions is a hollow elastic tube extending between the distal ends of said chamber portions and attached through the distal ends to the exteriors of the chamber portions such that the buoyancy chamber is sealed to the outside.

4. The fish lure of claim 3, wherein when a fishing line continuously extends through the hollow elastic tube such that said fish lure is retained in position on said fishing line by rotating the fore and aft chamber portions about the central axis, twisting the hollow elastic tube about the fishing line and capturing the segment of the fishing line passing therethrough within the elastic tube.

5. The fish lure of claim 1, further comprising one or more means for attracting fish disposed within the buoyancy chamber.

6. The fish lure of claim 5, wherein said one or more means for attracting fish are selected from the group consisting essentially of noise making members, light reflecting members, and scent dispersing members.

7. The fish lure of claim 1, further comprising one or more means for attracting fish disposed along the outside of the fish lure.

8. The fish lure of claim 7, wherein said one or more means for attaching fish are selected from the group consisting essentially of motion making members, and fish hook members.

9. The fish lure as set forth in claim 1, wherein the means for attaching the fore and aft chamber portions includes a threaded end cap and a hollow rod having first and second ends, the first end having an annular flange against which the distal end of one of the chamber portions is positioned and the second end having a threaded protrusion over which threaded protrusion both fore and aft chamber portions are mounted about the hollow rod, said threaded end cap rotatably engages the threaded protrusion of the hollow rod to connect the fore and aft chamber portions such that the buoyancy chamber is sealed to the outside.

10. The fish lure of claim 9, wherein the fore and aft chamber portions, as well as threaded end cap and hollow rod, are all of transparent colorless plastic.

11. The fish lure of claim 9, wherein one or more means for attracting fish are disposed within the buoyancy chamber.

12. The fish lure of claim 11, wherein said one or more means for attracting fish are selected from the group consisting essentially of noise making members, light reflecting members, and scent dispersing members.

13. The fish lure of claim 9, further comprising a means for attracting fish housed within the hollow rod of the fish lure.

14. The fish lure of claim 13, wherein said means for attracting fish is an artificial light source.

15. The fish lure of claim 9, further comprising one or more means for attracting fish disposed along the outside of the fish lure.

16. The fish lure of claim 9, further comprising a fishing line attachment means located external to the buoyancy chamber and proximate to an end of the fish lure.

* * * * *